Figure 4:
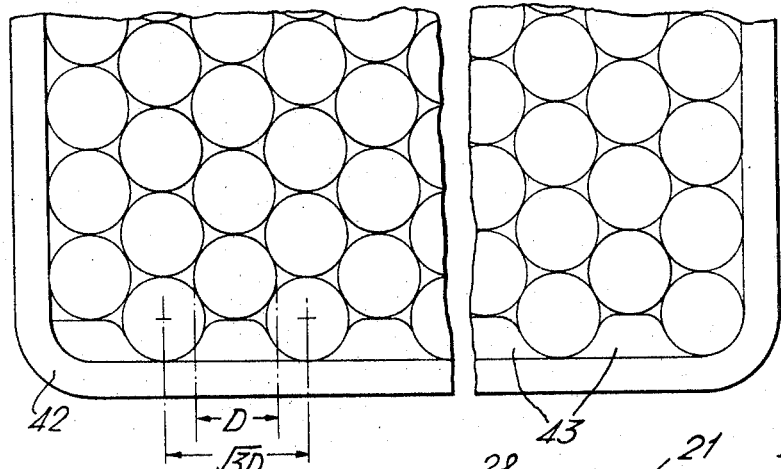

Oct. 18, 1966     D. T. N. WILLIAMSON     3,279,145
METHOD OF STACKING
Filed Sept. 21, 1962     5 Sheets-Sheet 1
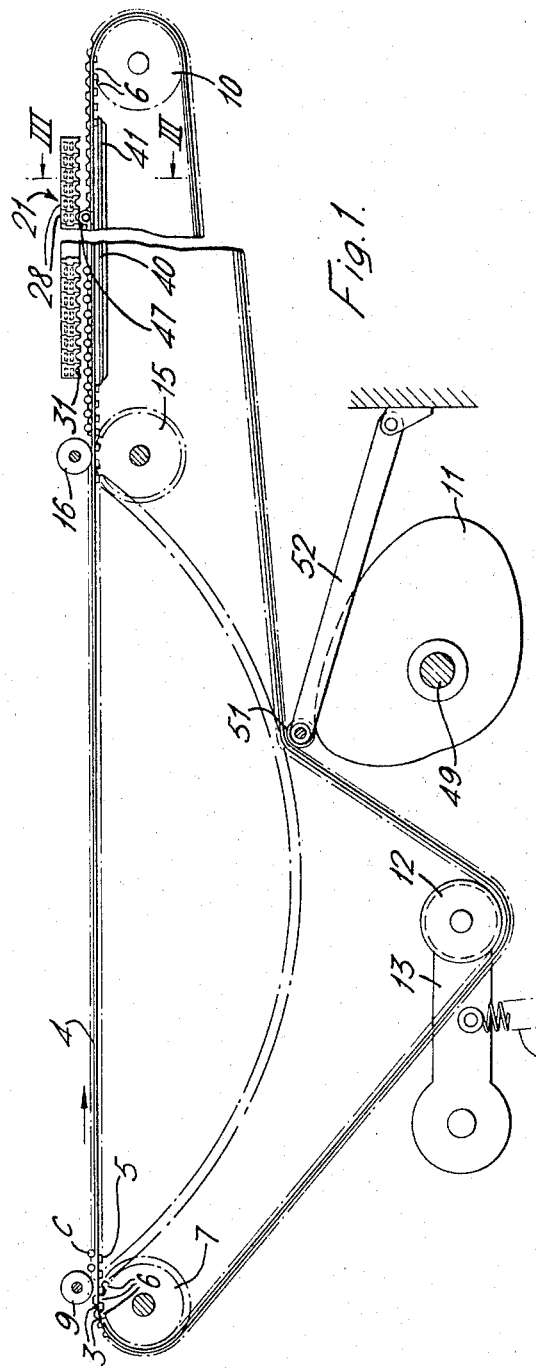
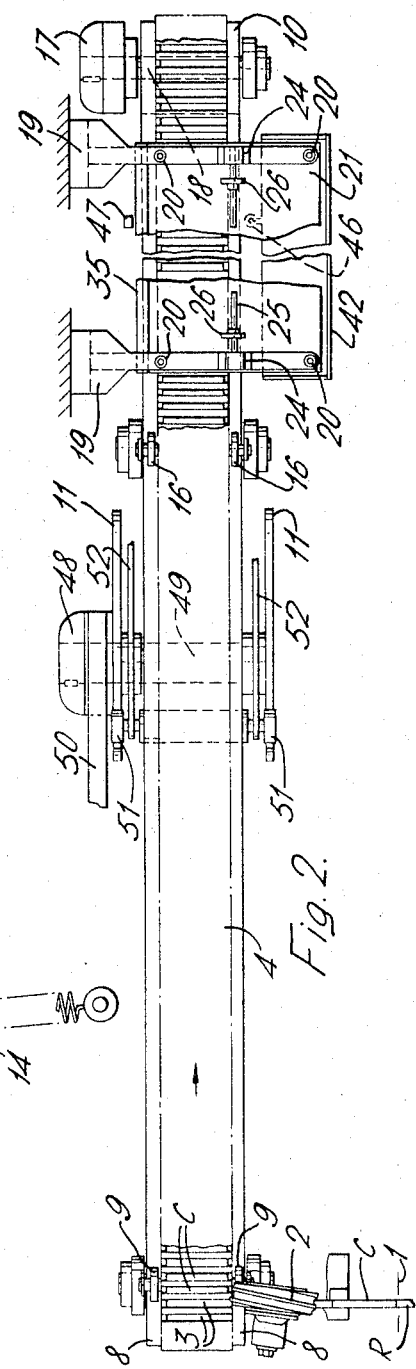
INVENTOR
David T. N. Williamson,
By Watson, Cole, Grindle & Watson
ATTORNEYS Oct. 18, 1966  D. T. N. WILLIAMSON  3,279,145
METHOD OF STACKING Filed Sept. 21, 1962  5 Sheets-Sheet 2

INVENTOR
David T. N. Williamson,
By Watson, Cole, Grindle + Watson
ATTORNEYS

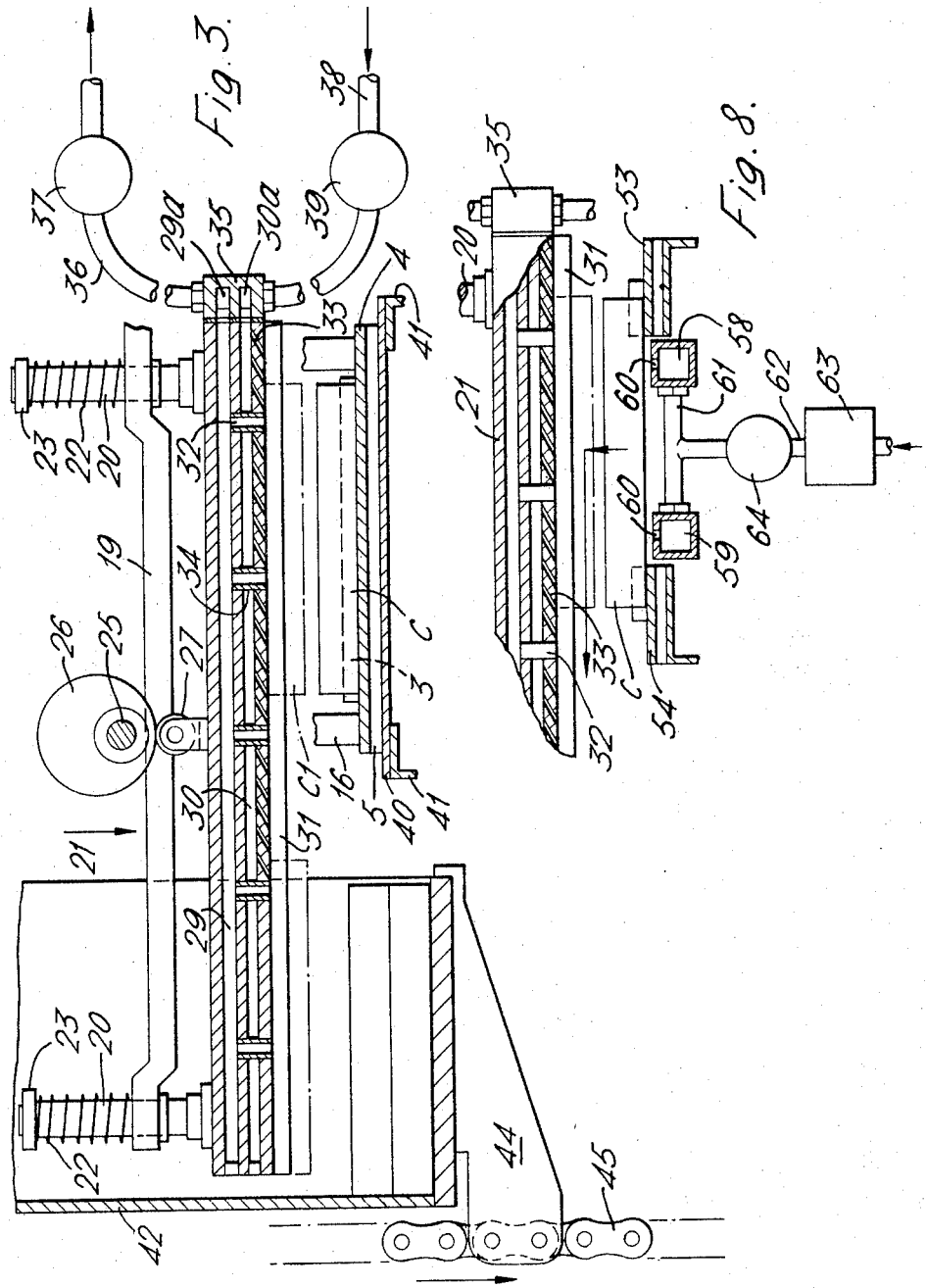

Oct. 18, 1966  D. T. N. WILLIAMSON  3,279,145
METHOD OF STACKING
Filed Sept. 21, 1962  5 Sheets-Sheet 4

INVENTOR
David T. N. Williamson,
By Watson, Cole, Grindle & Watson
ATTORNEYS

Oct. 18, 1966   D. T. N. WILLIAMSON   3,279,145
METHOD OF STACKING

Filed Sept. 21, 1962   5 Sheets-Sheet 5

Inventor
David T. N. Williamson,
By Watson, Cole, Grindle & Watson
ATTORNEYS

United States Patent Office 3,279,145
Patented Oct. 18, 1966

3,279,145
METHOD OF STACKING
David Theodore Nelson Williamson, London, England, assignor to The Molins Organisation Limited, a company of Great Britain
Filed Sept. 21, 1962, Ser. No. 225,213
Claims priority, application Great Britain, Sept. 22, 1961, 34,027/61
1 Claim. (Cl. 53—35)

This invention concerns improvements in or relating to a method of and apparatus for filling a container adjacent to a continuous rod cigarette-making machine with cigarettes which are delivered from the cigarette-making machine on to a catcher band.

It has been customary to fill cigarettes from the catcher band of a continuous rod cigarette-making machine by hand into containers, one container at a time being situated adjacent to the catcher so that the filling thereof is a comparatively simple hand operation. As, however, the speed of production of cigarette-making machines has increased, it has been found to be increasingly arduous for an operative to keep up with the number of cigarettes on the catcher band. These difficulties have led to the introduction of larger containers and to the automatic filling of containers.

The general object of the invention is to provide a method of filling cigarettes in a container, in which the cigarettes are stacked in rows, comprising the steps of stacking a first row so that the pitch of adjacent cigarettes in the first row is equal to the cigarette diameter multiplied by the square root of three, and of stacking the next adjacent row so that the pitch of adjacent cigarettes in the next adjacent row is the same as the pitch in the first row and the pitch of the two adjacent rows is equal to the cigarette radius.

The container may be provided with a fluted base, the pitch of the flutes being equal to the cigarette diameter multiplied by the square root of three, and the bottom row of cigarettes nesting in the flutes, and each cigarette of each subsequent row being guided to its stacked position by one cigarette only of the row immediately below.

A further object of the invention is to provide a container filling apparatus in which cigarettes are stacked in a container in rows, comprising conveying means by which cigarettes are conveyed sideways in spaced array, the distance between the longitudinal axis of adjacent cigarettes being equal to the cigarette diameter multiplied by the square root of theree, a transfer member along which cigarettes are axially movable, lowering means to move the container downward and motive means to move cigarettes from the conveying means to the container via the transfer member so that they are stacked in the container in rows in the spaced array.

The motive means may move sufficient cigarettes to form a row in the container and the lowering means may move the container downward through a distance equal to the cigarette radius subsequent to the movement of each row into the container between the bottom and top rows. The transfer member may be provided with parallel tracks, or concave channels, directed towards the container, the pitch of the tracks being equal to the cigarette diameter multiplied by the square root of three. The motive means may comprise two sets of openings within the tracks of the transfer member, one set communicating with a suction source and the other set, the openings of which are inclined toward the container, communicating with a compressed air source. The apparatus may comprise means to stop part of the conveying means passing below the transfer member during the time cigarettes are moved by an air stream from the conveying means to the transfer member.

A still further object is to provide apparatus for supporting a cigarette from an inverted member, comprising two sets of openings within the member, one set of openings communicating with a suction source so as to impart an upward force on the cigarette within the sphere of action of the openings and the other set acting in cooperation with the first set, communicating with a compressed aid source so as to impart a downward force on the cigarette, the two forces holding the cigarette in equilibrium at a distance from the member. The inverted member may be a track, in which the set of openings communicating with the compressed air source is inclined to the longitudinal axis of the track, the air streams so produced acting on an end of the cigarette so as to impel it along the track.

Figure 5:
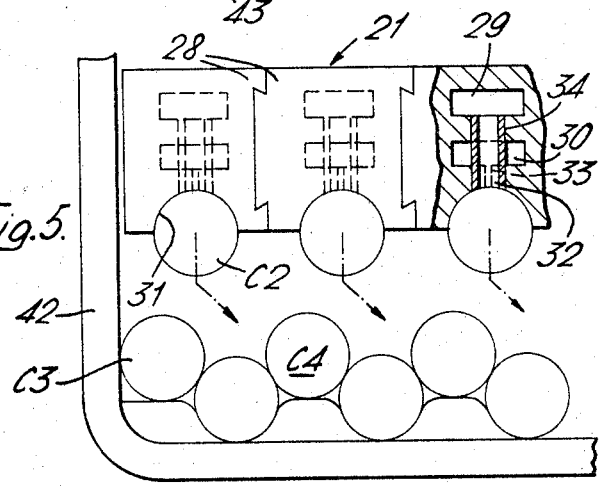
Figure 6:
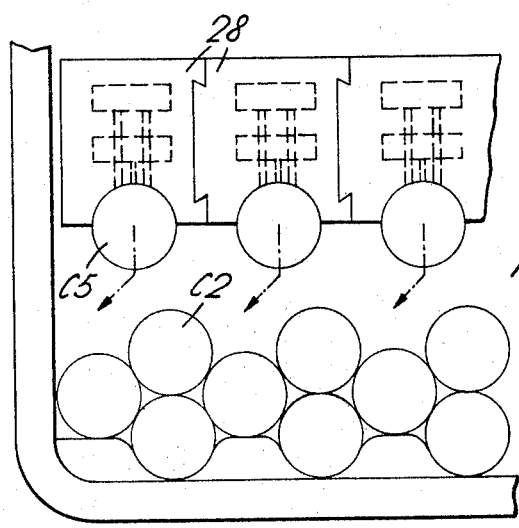
Figure 7:
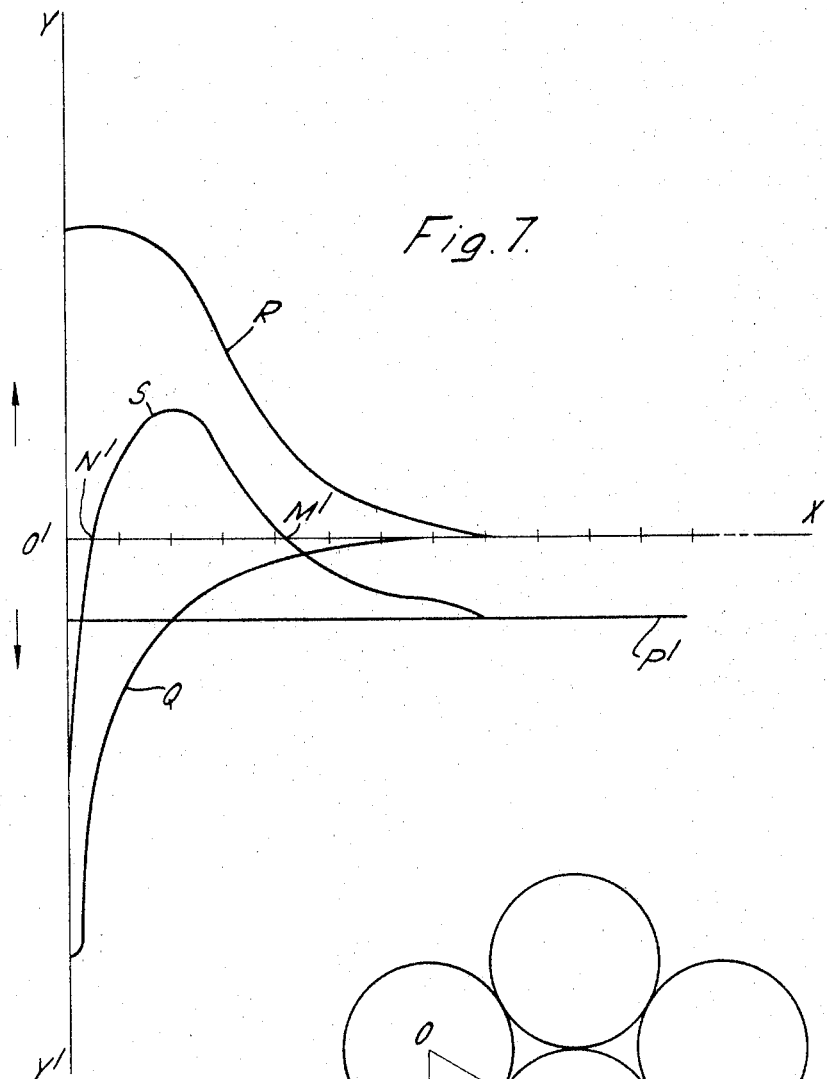
Figure 11:
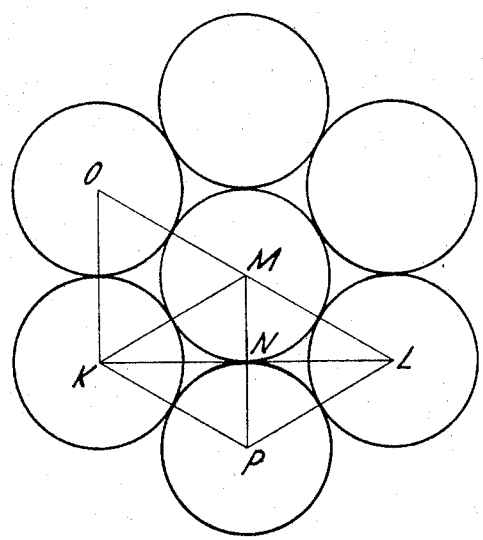
Figure 9:
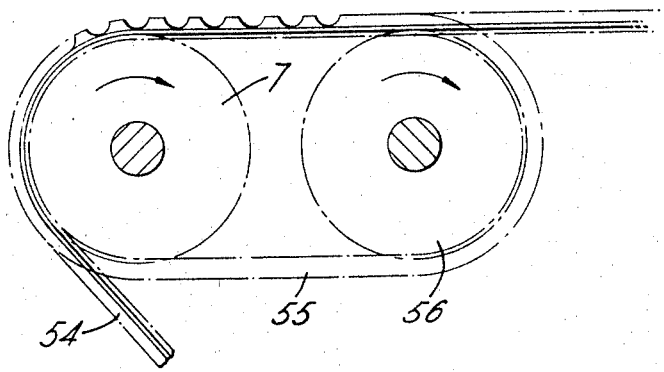
Figure 10:
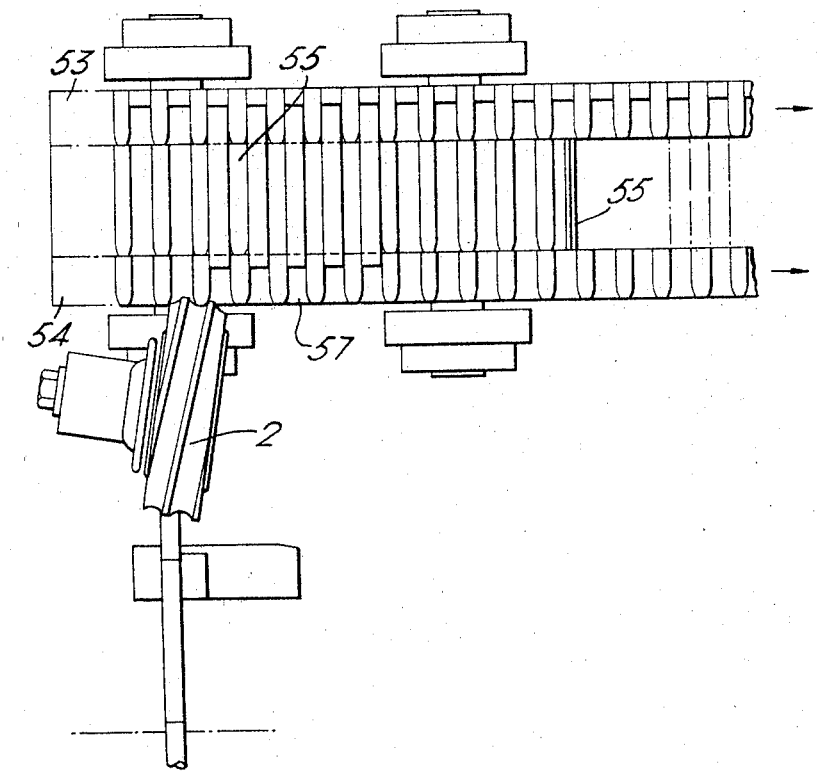

Further objects and features of the invention will be apparent from the following description, taken in connection with the accompanying drawings, in which:

FIGURE 1 is a side view of apparatus for filling a container,
FIGURE 2 is a plan view, partly cut away, of FIGURE 1,
FIGURE 3 is a section to a different scale on the lines III—III of FIGURE 1,
FIGURE 4 is a part end view of a container filled with cigarettes,
FIGURES 5 and 6 are part end views of the containers of FIGURE 4 showing successive filling stages,
FIGURE 7 is a graphical representation of the forces acting on cigarettes held by a transfer head,
FIGURE 8 is a sectional view of an alternative embodiment of apparatus for filling a container,
FIGURE 9 is an end view of a further portion of the embodiment shown in FIGURE 8,
FIGURE 10 is a plan view of FIGURE 9,
FIGURE 11 is an arrangement of seven cigarettes in a container.

Referring first to FIGURES 1 and 2, a continuous cigarette rod R is cut into cigarettes C by a cut-off, the knife of which is shown diagrammatically at 1 (FIGURE 2). The cigarettes are accelerated and given a component of movement in a transverse direction to their lengthwise movement by a deflector 2 so that they are fed into the flutes 3 of a catcher band which is travelling in the direction shown by the arrows. The underside of the catcher band 4 is moulded into bars 5 which engage with teeth 6 of a driving pulley 7. The top side of the catcher band 4 has flat portions 8 on either side of the flutes 3, the purpose of these flat portions being described hereinafter. Two idlers 9 are situated over the flat portions 8 adjacent to the driving pulley 7 and hold the catcher band 4 to the driving pulley 7.

At the opposite end of the catcher band 4, a tail pulley 10, having similar teeth 6, returns the catcher band 4. The return run of the catcher band 4 passes over cam roller 51 held on two pivoted arms 52 and operated by cam 11, and about a roller 12 carried on an arm 13 and tensioned by a spring 14, back to the driving pulley 7. Between the driving and tail pulleys the catcher band 4 passes between idler pulleys 15 and 16, of which the lower one 15 is toothed and the upper pulleys 16 run only on the flat portions 8 of the catcher band 4. The tail pulley 10 is connected to a magnetic brake 17 through a common shaft 18.

Between the tail pulley 10 and the idler 15 and above the catcher band 4, two brackets 19 (FIGURE 2) are rigidly fixed at one of their ends to the main frame of the machine. Each bracket 19 is provided with two holes through which posts 20 are loosely mounted so as to be capable of sliding through the holes. The lower ends of the posts 20 (FIGURE 3) are firmly fixed to a transfer head 21 which is movable in relation to the brackets 19 and which is urged in an upward direction by means of springs 22 on the posts 20, the springs 22 being held in compression between the brackets 19 and flanges 23 at the top end of each post. Supported on the two brackets 19 by means of plummer blocks 24 (FIGURE 2), a cam shaft 25 (FIGURES 2 and 3) is provided with two cams 26 against which rollers 27 are held by the action of the springs 22, the rollers 27 being fixed to the transfer head 21.

The transfer head 21 comprises a series of segments 28 (FIGURES 1 and 5), joined together, each of which is provided with an upper port 29 and a lower port 30. A groove 31 is provided on the underside of each segment 28, the shape of the groove 31 being approximately the same as part of the cigarette cross-section. The groove 31 communicates with the upper port 29 by means of a series of large diameter holes 32 (FIGURE 3) and with the lower port 30 by means of a series of small diameter holes 33 which are drilled through the body of the segment 28 at an angle to the length of the port 30, as shown in FIGURE 3. The holes 32 are bounded by tubes 34. The ports 29 and 30 communicate with a manifold 35 having an upper opening 29a and lower opening 30a. The upper opening 29a communicates through a pipe 36 and a control valve 37, to a source of suction which is not shown. The lower opening 30a communicates through a pipe 38 and a control valve 39 to a source of air pressure. In both cases the direction of air flow is indicated by arrows in FIGURE 3.

In the vicinity of the transfer head 21 and below the catcher band 4 a support plate 40 is fixed to angle runners 41 (FIGURES 1 and 3).

The cigarettes are filled into a container 42 (FIGURE 4), the bottom of which is provided with regular projections 43 into which the bottom row of cigarettes nests. The tray 42 (FIGURE 3), while it is being filled, rests on carrier supports 44 attached to a continuously moving chain conveyor 45, the direction of movement being as shown by an arrow in FIGURE 3.

A light source 46 (FIGURE 2) is positioned to one side of the catcher band 4 and below the transfer head 21, the light from which is received by a photo-electric cell 47 (FIGURES 1 and 2) positioned on the opposite side of the band 4 to the light source 46. The signal from the photo-electric cell 47 is then transmitted, via a control panel which is not shown, to the magnetic brake 17. The signal from the photo-electric cell 47 also operates a magnetic clutch 48 (FIGURE 2) located on a shaft 49 to which is keyed the cam 11. The shaft 49 is driven from a suitable source on the machine through a "V" belt 50.

The operation of the apparatus will now be described. In FIGURE 2 the continuously produced cigarette rod R is cut into cigarettes C by the cut-off knife 1. The cigarettes are accelerated by the deflector 2 and are given a component of movement in the direction of motion of the catcher band 4 so that they are fed into consecutive flutes 3 of the band. The pitch of the flutes 3 is arranged to be the diameter of the cigarettes multiplied by the square root of three. The length of the catcher band 4, as can best be seen in FIGURE 1, is longer than is required for merely joining driving pulley 7, tail pulley 10, cam 11 and spring loaded roller 12.

Before the machine is started there are no cigarettes on the catcher band, which is in the position shown in full line in FIGURE 1, i.e. a straight run from the driven pulley 7 to the tail pulley 10 with the cam 11 in the position shown and the spring loaded roller 12 in its lowest position, i.e. the band tension is a minimum. As soon as the machine is started the following sequence takes place:

(a) Cigarettes C are filled into consecutive flutes 3 as the band 4 moves toward the tail pulley 10. When the leading cigarette is positioned between the light source 46 and the photo-electric cell 47, a signal is transmitted to the magnetic brake 17 to lock the shaft 18 and to the magnetic clutch 48 to engage the shaft 49 so that it is positively driven. The distance between the photo-electric cell 46 and the position at which it is desired that the leading cigarette will come to rest, this distance being in the direction of movement of the catcher band, is sufficient to allow the band 4 to decelerate to rest without disturbing the cigarettes C carried thereon.

(b) As soon as the shaft 18 is locked, all the cigarettes between the tail pulley 10 and the idler 15 come to rest and, as will be described later, are ready to be lifted from the catcher band 4 by the transfer head 21. During this rest period that portion of the band 4 between the drive pulley 7 and the idler 15 continues to move forward (in the direction of the arrow in FIGURE 2). The position where the two idlers 16 ride on the flat portion 8 of the band with the idler 15 engaging the teeth 6 directly underneath, forms a barrier to the forward movement of the band 4, which then begins to form a loop between the driving position represented by the idlers 9 and the locked position represented by the idlers 15 and 16. While the loop forms, the cam 11 is rotating and the roller 12 is rising, thus making available the extra part of the band 4 which was stored in the full line position shown in FIGURE 1.

(c) As soon as the cigarettes between the idler 15 and the tail pulley 10 have been lifted clear of the flutes 3 of the catcher band 4, the magnetic brake 17 is released by means of a signal from a timing mechanism within the control panel. A force resulting from tension in the lower part of the band 4 due to the action of the spring 14 and of the cam 11, which now starts to lift, causes that portion of the band 4, from which the cigarettes have just been lifted, to move in a forward direction and to gather speed.

(d) During the acceleration of the band 4 under the transfer head 21, the loop continues to increase in size until the linear speed of the band over the drive pulley 7 and tail pulleys 10 is equal.

(e) The band under the transfer head 21 continues to accelerate by using up the loop, the accelerating force being due to the combined action of the cam 11 and the spring 14.

(f) After the maximum speed of the band 4 under the transfer head 21 has been reached, the band 4 starts to decelarate due to release of tension of the underside of the band when the cam 11 starts to fall.

(g) As soon as the leading cigarette fills the space between the light source 46 and the photo-electric cell 47, a signal again causes the magnetic brake 17 to lock and the cam shaft 49 to stop. The cycle is then repeated.

During operation (b) described above the cigarettes under the transfer head 21 are lifted clear of the flutes 3. The lifting is effected by lowering the transfer head 21 by means of the action of the cams 26 on the rollers 27 (FIGURE 3), thereby forcing the head 21 downwards. While the head 21 is moving down, the valve 37 opens and the suction source is put into direct communication with the suction holes 32. At the bottom of the stroke of the head 21 the suction is strong enough to lift all the cigarettes from the flutes 3 in which they are located. As soon as the head 21 has lifted the cigarettes clear of the flutes 3, the valve 39 opens and allows direct communication between the compressed air source and the holes 33.

In FIGURE 7 the forces which result from suction and air pressure acting on a cigarette are shown. The distance along the axis $O^I X$ represents the distance of a cigarette away from the top of the groove 31 in one of the segments 28. $O^I Y$ represents the magnitude of the force lifting the cigarette upward due to suction and $O^I Y^I$ represents the total downward force on the cigarette due to gravity and air pressure. The line $P^I$ represents the mass of the cigarette acting downward; Q is the force due to air pressure acting through the holes 33; R is the upward force due to suction acting through the holes 32; and S is the resultant force due to the combined action of $P^I$, Q and R. An examination of S shows that there are two distances from $O^I$, $N^I$ and M', at which there is a zero force acting on the cigarettes and at these two distances the cigarettes are held in a state of equilibrium without moving up or down. However, the further distance M' represents an unstable condition since, if for any reason the cigarette moves still further away it will fall. At the nearer distance $N^I$, the position is stable, since, any movement away from it, leads to a resultant force tending to return the cigarette to that position. Hence the cigarette will remain suspended.

It is to be appreciated that the system of forces shown in FIGURE 7 apply to one set of conditions only, i.e. for one particular suction force and one particular repulsion force. If the values for air pressure and suction are varied or if the size of the holes 32 and 33 are changed, then a set of different curves will be obtained.

As soon as compressed air is admitted to the holes 33, the cigarettes held by suction will move to the stable position $N^I$ as shown in FIGURE 7. In the case of those holes 33 directly above a cigarette, for instance cigarette $C_1$, in FIGURE 3, the fact that they have been drilled at an angle to the axis of the cigarette is of no importance. The component of force acting vertically downward is that which helps to balance the upward suction force. In the case however of the two holes drilled at the right hand end of the transfer head 21 (as seen in FIGURE 3), the force of air leaving these two holes has a component in the direction of the axis of the cigarette $C_1$ and this force acts on the end of the cigarette causing it to move along the groove 31. As there is no contact between the cigarette and the groove there is no friction (apart from the viscosity of the air between them) and thus the force impelling the cigarette need only be very small.

Before the cigarette reaches the left hand end of the groove 31, the valve 37 closes thus cutting off suction and the cigarette falls from the transfer head 21 into the tray 42. Referring to FIGURES 5 and 6, it can be seen that by positioning the transfer head 21 so that the center line of each groove lies directly over a point positioned $\sqrt{3}$ times half the radius of a cigarette away from the center of a cigarette directly below each groove, alternate rows of cigarettes will automatically position themselves correctly, i.e. in the desired staggered formation. For instance, in FIGURE 5, a cigarette $C_2$ held to the transfer head 21 falls as soon as suction is cut off by the valve 37. In falling, it is guided by cigarette $C_3$ into the vacancy between $C_3$ and the adjacent cigarette $C_4$ of that row, i.e. it moves to the right. In FIGURE 6, the position just before the next row of cigarettes falls is shown. In this case cigarette $C_5$ falls onto the cigarette below, $C_2$, and is guided to the left, to the vacancy between $C_2$ and the wall of the container 42.

The tray 42 is arranged to be travelling downward at a steady rate, the downward speed being such that between the discharge of successive rows the tray will have moved a distance equal to the radius of the cigarettes. As soon as a tray is completely filled, which will be done so that an exact number of cigarettes have been fed in, a quick release mechanism of known design will remove the tray and feed in an empty one.

The spacing of the cigarettes in the container is the normal honeycomb arrangement in which any one cigarette is surrounded by six others. This arrangement can lead to stacking in which cagarettes abut each other in rows and is the arrangement of stacking in existing containers. However by tilting these rows through 30° the pitch of the cigarettes is increased to $\sqrt{3}$ times the diameter.

FIGURE 11 shows a honeycomb cluster of six cigarettes surrounding one other. K, L, M, N, O and P are centers of cigarettes, all of radius R and diameter D. The centers are joined. In triangle OKM, $$OK=KM=MO=2R=D$$

$\therefore$ each angle $=60°$

Similarly in triangles MKP and MPL all the angles$=60°$ $\therefore$ OML is a straight line Join KL which intersects MP at N $$OK=D \text{ and } OL=2D$$

$$\therefore KL^2=OL^2-OK^2$$
$$=4D^2-D^2$$
$$=3D^2$$

$\therefore KL=D\sqrt{3}=$cigarette diameter multiplied by the square root of three.

MN is parallel to OK since both angles KOL and PML equal 60°

$$\therefore MN/OK=ML/OL$$
$$=D/2D=\tfrac{1}{2}$$

$\therefore MN=R=$cigarette radius and N lies on the circumference of the circle whose centre is at M.

$\therefore$ the pitch of alternate rows equals the cigarette radius.

An alternate construction is shown in FIGURES 8, 9 and 10 in which like numbers refer to like parts. The catcher band is divided into two parts 53 and 54 (FIGURES 8 and 10), which are continuous and of similar construction to the band 4. Between 53 and 54 runs a short band 55 which is driven by the driving pulley 7 and which returns about a tail pulley 56. This arrangement allows cigarettes to be fed, as previously described, by the deflector 2 but permits an open space to remain under the cigarettes after the band 55 is diverted by the pulley 56. To prevent any possibility of a cigarette which is entering the catcher band being obstructed by a sharp corner, the entry of all flutes on bands 53, 54 and 55 is bell mounted as at 57.

Under the transfer head 21 and between the bands 53 and 54 are two longitudinal chambers 58 and 59 both having holes drilled in their top at 60 (FIGURE 8). The chambers 58 and 59 are interconnected by a pipe 61 to which is "T'd" a further pipe 62 connected to an air receiver 63. Between the chambers and the air receiver is a valve 64, the receiver being connected to a compressed air supply.

As soon as the valve 64 is opened compressed air is admitted to the chambers 58 and 59 and air streams issuing through the hole 60 blow any cigarette C positioned above up into the suction sphere of influence of the holes 32.

It will be understood that the invention is not restricted to the two embodiments described herein. Other constructions are envisaged as lying within the scope of the invention. For instance, the transfer member may be a horizontally disposed plate, having flutes on its upper surface, and the motive means, instead of comprising air currents, may be a plunger or rotatable rollers made from a resilient material adapted to move a row of cigarettes from the conveying means over the transfer member and into the container.

What I claim as my invention and desire to secure by Letters Patent is:

A method of stacking cigarettes in a container in which each cigarette is supported along a central and two outer lines of contact, said container having spaced projections in the bottom thereof, each line of contact being parallel with the longitudinal axis of the cigarette, comprising the steps of depositing a bottom row in the container so that they are spaced apart by the projecting parts of the bottom of the container, suspending subsequent rows successionally with the longitudinal axis of each suspended cigarette positioned directly over one of said outer lines of contact and removing suctional support so as to permit the suspended row to drop.

References Cited by the Examiner

UNITED STATES PATENTS

| | | | |
|---|---|---|---|
| 387,140 | 7/1888 | Buck | 53—36 |
| 1,525,667 | 2/1925 | Smith | 53—36 |
| 1,539,745 | 5/1925 | Kerlin et al. | 53—149 X |
| 1,927,648 | 9/1933 | Neff | 53—150 X |
| 1,993,619 | 3/1935 | Neff et al. | 53—150 |
| 2,535,880 | 12/1950 | Tomkins | 53—149 X |
| 2,591,202 | 4/1952 | Ruau | 53—236 |
| 2,826,883 | 3/1958 | Pollmann | 53—236 |

FOREIGN PATENTS

| | | |
|---|---|---|
| 848,760 | 7/1939 | France. |
| 425,989 | 3/1935 | Great Britain. |

FRANK E. BAILEY, *Primary Examiner.*

TRAVIS S. McGEHEE, GRANVILLE Y. CUSTER, JR., *Examiners.*

A. E. FOURNIER, P. H. POHL, *Assistant Examiners.*